(12) United States Patent
Beiler

(10) Patent No.: US 10,300,970 B2
(45) Date of Patent: May 28, 2019

(54) SELF-PROPELLED TRAILER

(71) Applicant: New Heights LLC, Paradise, PA (US)

(72) Inventor: Aaron Jay Beiler, Paradise, PA (US)

(73) Assignee: New Heights LLC, Leola, PA (US)

( * ) Notice: Subject to any disclaimer, the term of this patent is extended or adjusted under 35 U.S.C. 154(b) by 0 days.

(21) Appl. No.: 14/789,470

(22) Filed: Jul. 1, 2015

(65) Prior Publication Data

US 2016/0001832 A1 Jan. 7, 2016

Related U.S. Application Data

(60) Provisional application No. 62/019,666, filed on Jul. 1, 2014.

(51) Int. Cl.
  *B60P 1/54* (2006.01)
  *B62D 59/04* (2006.01)
  (Continued)

(52) U.S. Cl.
  CPC ............... *B62D 59/04* (2013.01); *B60P 1/54* (2013.01); *B62D 21/186* (2013.01); *B62D 21/20* (2013.01);
  (Continued)

(58) Field of Classification Search
  CPC ........... B60P 1/54; B62D 21/20; B62D 59/04; B62D 61/08; B62D 21/186; B62D 33/02;
  (Continued)

(56) References Cited

U.S. PATENT DOCUMENTS 172,454 A 1/1876 Kramer
175,385 A 3/1876 Steward
(Continued)

FOREIGN PATENT DOCUMENTS

BG 50320 A1 7/1992
DE 202006017189 U1 2/2007
(Continued)

OTHER PUBLICATIONS

PCT Notification, International Preliminary Report on Patentability and Written Opinion of the International Searching Authority, dated Jan. 12, 2017, 10 pages.
(Continued)

*Primary Examiner* — Ronald P Jarrett
*Assistant Examiner* — Ashley K Romano
(74) *Attorney, Agent, or Firm* — Barley Snyder

(57) ABSTRACT

A self-propelled trailer is provided and includes a frame, a pair of rear drive wheels, a steerable wheel, a drive system, a platform, and a lifting device. The pair of rear drive wheels are positioned under the frame along one end thereof, while the steerable wheel is positioned under the frame along an opposite end thereof with respect to the pair of rear drive wheels. The drive system includes a power system connected to the pair of rear drive wheels and a control system connected to the steerable wheel. The platform is positioned above the frame, while the lifting device is positioned between the steerable wheels and the pair of rear wheels. The platform includes a crane extending upward from the frame.

22 Claims, 12 Drawing Sheets

(51) Int. Cl.
  *B62D 21/18* (2006.01)
  *B62D 33/02* (2006.01)
  *B62D 63/08* (2006.01)
  *B62D 21/20* (2006.01)

(52) U.S. Cl.
  CPC .............. *B62D 33/02* (2013.01); *B62D 63/08* (2013.01); *B60Y 2200/147* (2013.01); *B60Y 2400/204* (2013.01)

(58) Field of Classification Search
  CPC .............. B62D 63/08; B60Y 2200/147; B60Y 2400/204
  See application file for complete search history.

(56) References Cited

U.S. PATENT DOCUMENTS

| | | |
|---|---|---|
| 545,264 A | 8/1895 | Booth et al. |
| 1,390,122 A | 9/1921 | Carlson |
| 1,497,489 A | 6/1924 | Cochran |
| 1,546,261 A | 7/1925 | Spencer |
| 1,942,319 A | 1/1934 | Wright |
| 1,985,169 A | 12/1934 | Howell et al. |
| 2,178,841 A | 11/1939 | Lienemann |
| 2,332,326 A | 10/1943 | Lex |
| 2,345,159 A | 3/1944 | Schroter |
| 2,387,568 A | 10/1945 | Drott et al. |
| 2,391,948 A | 1/1946 | Couse |
| 2,427,132 A | 9/1947 | Godbey |
| 2,436,017 A | 2/1948 | Powers |
| 2,867,339 A | 1/1959 | Nelson |
| 3,019,054 A | 1/1962 | Stahly |
| 3,035,722 A | 5/1962 | Anderson et al. |
| 3,092,273 A | 6/1963 | Schramm |
| 3,106,304 A | 10/1963 | Smale |
| 3,473,679 A | 10/1969 | Weichel |
| 3,619,007 A | 11/1971 | Phillips |
| 3,768,670 A | 10/1973 | Cloud |
| 3,800,966 A | 4/1974 | Newton |
| 3,902,616 A | 9/1975 | Santic et al. |
| 3,987,563 A | 10/1976 | Baur |
| 4,091,943 A | 5/1978 | Bay-Schmith |
| 4,568,028 A | 2/1986 | Verseef et al. |
| 4,676,330 A | 6/1987 | Roberts |
| 4,700,851 A | 10/1987 | Reeve et al. |
| 4,840,532 A | 6/1989 | Galbreath |
| 4,951,999 A | 8/1990 | Rudolph et al. |
| 5,000,645 A | 3/1991 | Polojarvi |
| 5,069,507 A | 12/1991 | Lindsey |
| 5,242,185 A * | 9/1993 | Carr .................... B62D 53/061 280/423.1 |
| 5,393,193 A | 2/1995 | Dagg |
| 5,490,755 A | 2/1996 | Billotte |
| 5,492,402 A | 2/1996 | Alton |
| 5,542,803 A | 8/1996 | Driggs |
| 5,580,134 A | 12/1996 | Allwine |
| 56,622,453 | 9/1997 | Gerstner |
| 5,720,526 A | 2/1998 | Roberts |
| 5,829,605 A | 11/1998 | Poitras |
| 5,975,832 A | 11/1999 | Winkler |
| 6,019,568 A | 2/2000 | Bratlie |
| 6,042,175 A | 3/2000 | Williams |
| 6,129,226 A | 10/2000 | Donovan |
| 6,217,122 B1 | 4/2001 | Kirbie |
| 6,220,811 B1 | 4/2001 | Bernecker |
| 6,238,166 B1 | 5/2001 | Collier |
| 6,254,192 B1 | 7/2001 | Spreitzer |
| 6,309,164 B1 | 10/2001 | Holder et al. |
| 6,386,573 B1 | 5/2002 | Solomon |
| 6,402,224 B1 | 6/2002 | Monaco et al. |
| 6,409,275 B1 | 6/2002 | Gerding |
| 6,527,494 B2 | 3/2003 | Hurlburt |
| 6,547,509 B1 | 4/2003 | Edmo |
| 6,688,836 B2 | 2/2004 | Gourand |
| 6,817,677 B1 | 11/2004 | Beiler |
| 7,037,062 B2 | 5/2006 | Oliver |
| 7,172,083 B2 | 2/2007 | Raines |
| 7,743,859 B2 | 6/2010 | Forsyth |
| 8,136,270 B1 | 3/2012 | Wammock |
| 8,215,717 B2 | 7/2012 | Stewart |
| 8,876,216 B2 | 11/2014 | Stewart |
| 2005/0253445 A1 | 11/2005 | Beiler |
| 2008/0211289 A1 | 9/2008 | Beiler |
| 2009/0277857 A1 | 11/2009 | Rice |
| 2013/0133172 A1 | 5/2013 | Kiener et al. |

FOREIGN PATENT DOCUMENTS

| | | |
|---|---|---|
| EP | 1447312 A1 | 8/2004 |
| FR | 2750411 A1 | 6/1997 |
| FR | 2867432 A1 | 3/2010 |
| JP | 2001347878 A | 12/2001 |

OTHER PUBLICATIONS

PCT Notification, International Search Report and Written Opinion of the International Searching Authority, Intl App. No. PCT/US2015/038824, dated Dec. 23, 2015, 14 pages.
Abstract of JP2001347878A, dated Dec. 18, 2001, 2 pages.
Abstract of EP1447312A1, dated Aug. 18, 2004, 1 page.
Abstract of DE202006017189U1, dated Feb. 15, 2007, 1 page.
Abstract of BG50320A1, dated Jul. 15, 1992, 1 page.
https://www.youtube.com/watch?v=9SdKs_nSS0U.†
http://www.easternmemorials.com/news.†

\* cited by examiner
† cited by third party

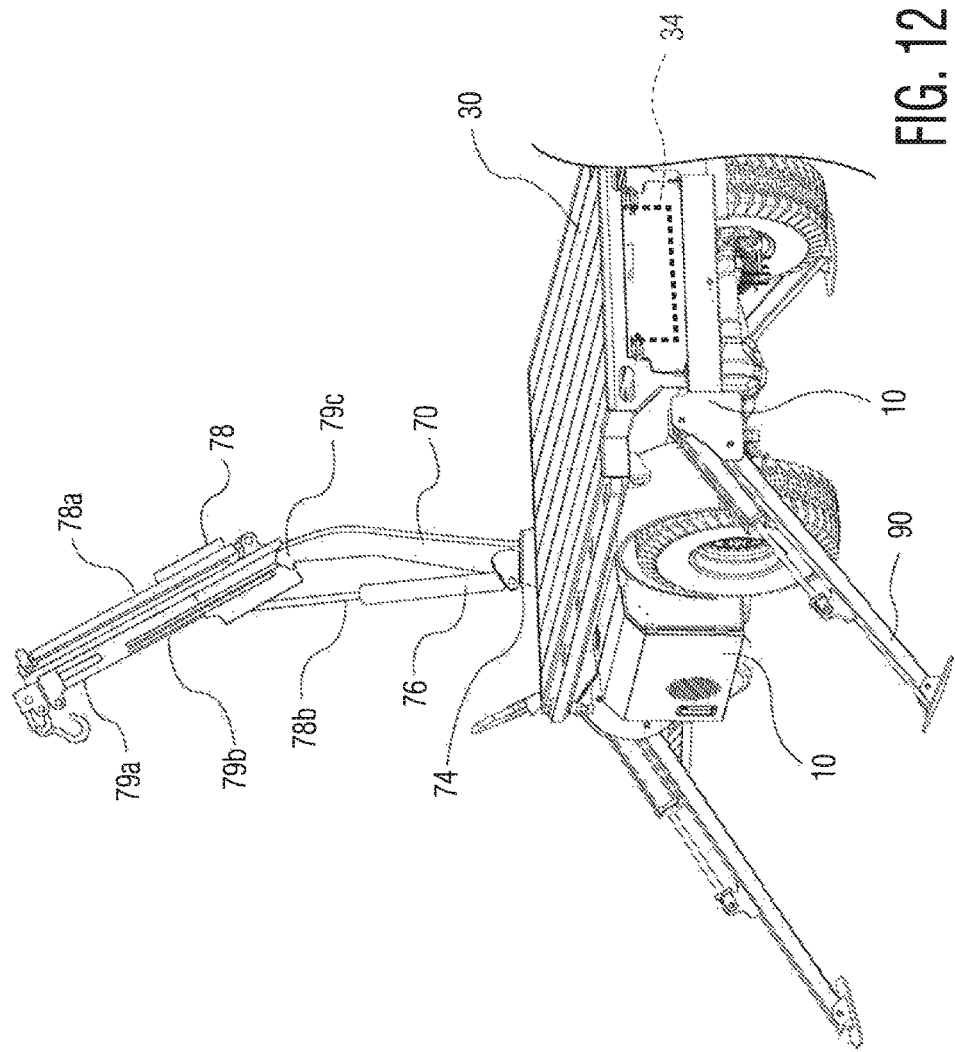

SELF-PROPELLED TRAILER

CROSS-REFERENCE TO RELATED APPLICATION

This application is a non-provisional application claiming the benefit of the filing dates under 35 U.S.C. § 119(e) of Provisional Patent Application No. 62/019,666, filed Jul. 1, 2014.

FIELD OF THE INVENTION

The invention relates to a self-propelled trailer and, more particularly, to a self-propelled trailer having a lifting device.

BACKGROUND

Providing materials for replacing a building roof is a time consuming, labor intensive job. Generally, it requires use of different mechanical devices, as well as manual labor, to lift materials from a supply truck and place them on a roof. Also, it is not always possible to move that supply truck into a location adjacent to a building. Fences, lawns, shrubs, and other property fixtures may stand in the way and can easily be damaged by the supply truck. It is even more likely when dealing with a typical large supply truck.

Therefore, there is a long felt need to have a vehicle that could move around a typical landscaped yard surrounding a building and could position building materials to an extended position without damaging the property.

SUMMARY

In view of the foregoing, a self-propelled trailer is provided.

The self-propelled trailer includes a frame, a pair of rear drive wheels, a steerable wheel, a drive system, a platform, and a lifting device. The pair of rear drive wheels are positioned under the frame along one end thereof, while the steerable wheel is positioned under the frame along an opposite end thereof with respect to the pair of rear drive wheels. The drive system includes a power system connected to the pair of rear drive wheels and a control system connected to the steerable wheel. The platform is positioned above the frame, while the lifting device is positioned between the steerable wheels and the pair of rear wheels. The platform includes a crane extending upward from the frame.

BRIEF DESCRIPTION OF THE DRAWINGS

The invention is explained in greater detail below with reference to embodiments and to the appended drawings of which:

FIG. 12 is another perspective view of the trailer according to the invention during operation of the lifting device.

DETAILED DESCRIPTION OF THE EMBODIMENT(S)

Figure 1:
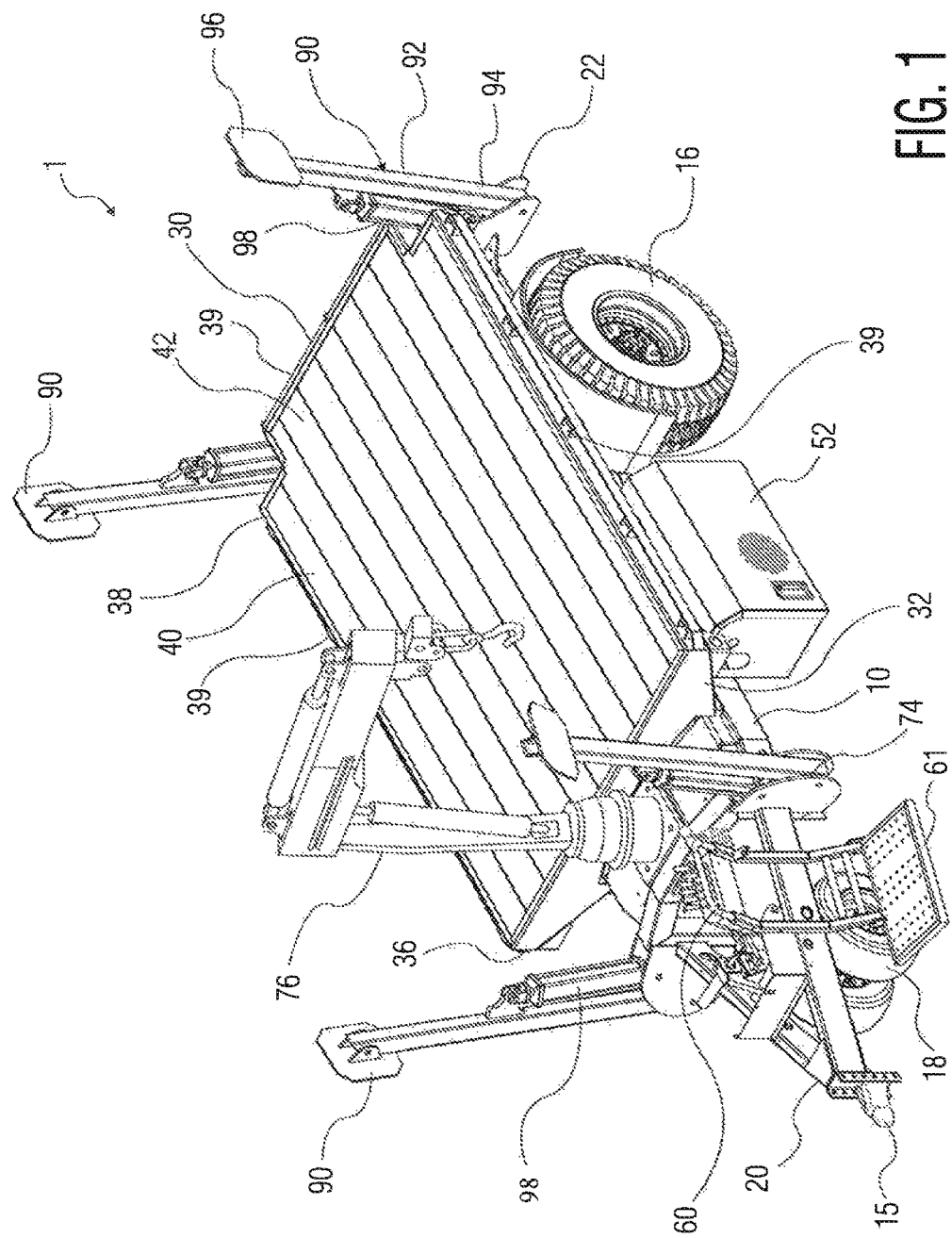
FIG. 1 is a perspective view of a trailer according to the invention.
Figure 2:
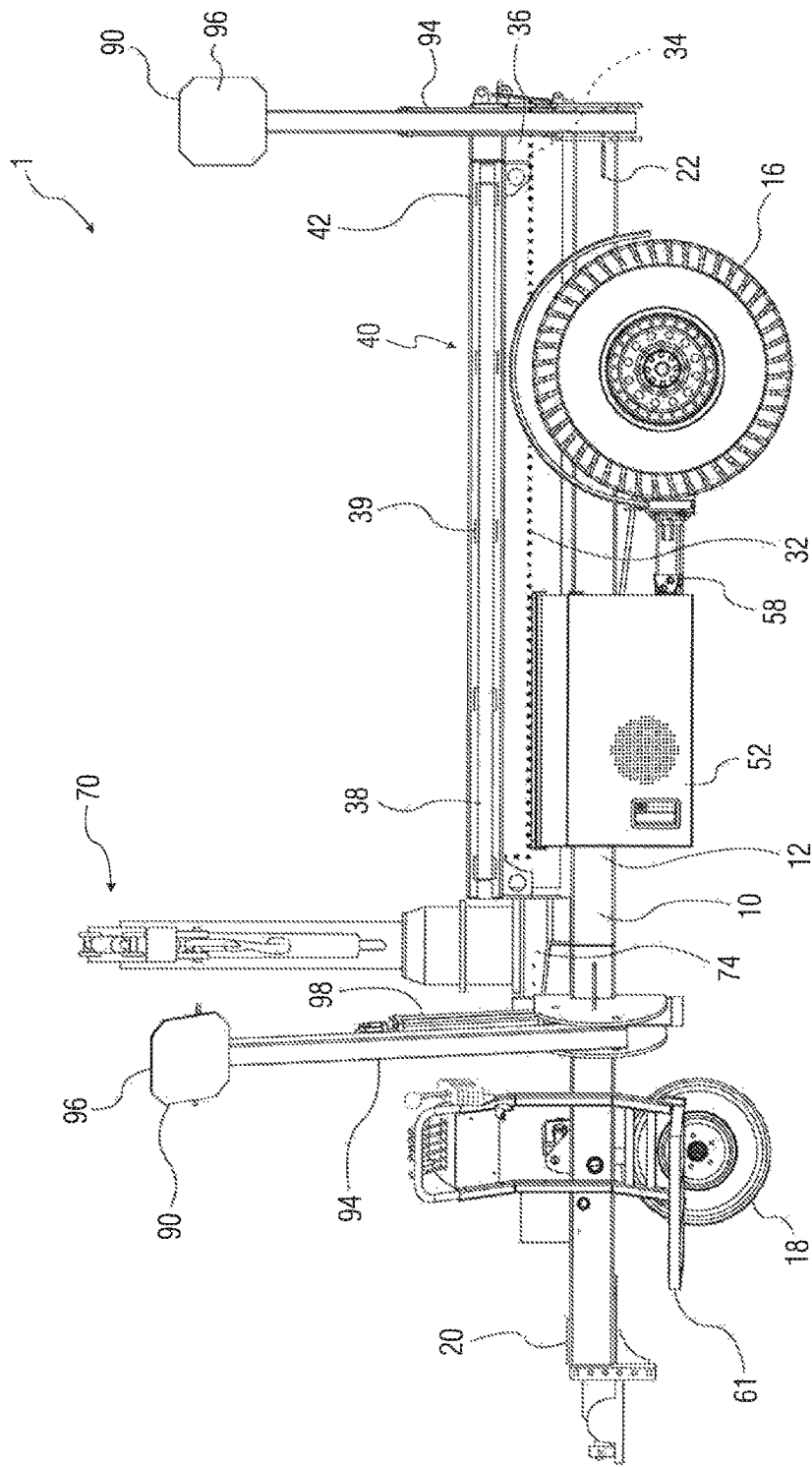
FIG. 2 is a right side view of the trailer of FIG. 1.
Figure 3:
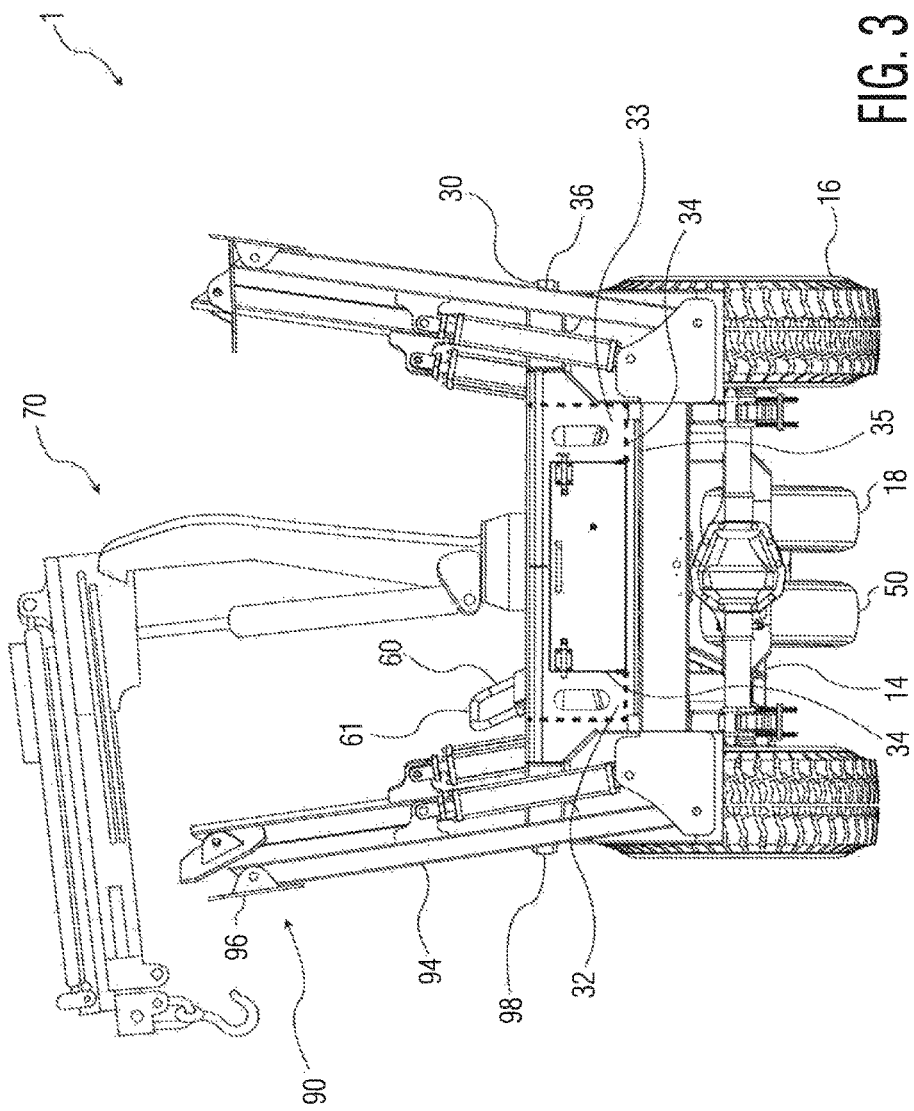
FIG. 3 is a rear view of the trailer of FIG. 1.

With respect to FIGS. 1-8, a trailer 1 according to the invention is shown ready for towing on a road by a power vehicle, such as a truck with a tow hitch.

As shown, the trailer 1 generally includes the following major components: a frame 10, a platform 30, a drive system 50, a lifting device 70, and a plurality of stabilizers 90.

As shown in FIGS. 1-4, the frame 10 includes a plurality of support beams 12, a plurality of connection beams 14, a pair of rear drive wheels 16, a pair of steerable front wheels 18, and towing device 20, such as a trailer hitch.

The plurality of support beams 12 extend along a length of the frame, from a front to a rear thereof, while the plurality of connection beams 14 run substantially perpendicular to and connect with the plurality of support beams 12 to form an undercarriage chassis 22. The trailer hitch 15 connects to a front end of the plurality of support beams 12. The trailer hitch 15 includes a connector for connecting with a truck (i.e. ball mount or other known trailer connection devices). The rear drive wheels 16 are positioned under the undercarriage chassis 22, while the steerable front wheels 18 are positioned under the trailer hitch 15 in the shown embodiment. However, one skilled in the art would appreciate that other designs are possible. For instance, the steerable front wheels 18 may also be positioned under the undercarriage chassis 22.

As shown in FIGS. 1-4, the platform 30 is positioned on top of and secured to the undercarriage chassis 22. The platform 30 includes a sub frame 32 and a non-skid deck 42. The sub frame 32 includes a storage unit 34, a top surface mount 36 positioned above the storage unit 34, and a plurality of side panels 38 extending upward from the top surface mount 36 to form a deck receiving section 40. The storage unit 34 is an open receiving space within the sub frame 32 and is positioned above the frame 10 and below the deck receiving section 40.

The storage unit 34 is accessible through a rear side 33 of the sub frame 32 by an access panel 35. According to the invention, the access panel 35 provides a large storage area within the sub frame 32 and under the deck receiving section 40. In the shown embodiment, the access panel 35 is rigidly connected to the sub frame 32 using a hinge and includes locks to secure the access panel 35 during travel. In the shown embodiment, the access is large enough to hold ramps, load bearing mats that allow heavy vehicles to travel over wet ground and sand (i.e. Mud-Traks mats), and other tools required by a user of the trailer 1.

In the shown embodiment, the non-skid deck 42 is formed from a plurality of dimensional lumber planks prepared from recycled rubber and positioned side-by-side to fill the deck receiving section 40. However, one skilled in the art should appreciate other materials may be used, including wood planks or other plastics sheets. The non-skid deck 42 sits on top of the top surface mount 36 and between the plurality of side panels 38. As a result, in the shown embodiment, the platform 30 has a level top surface on which building materials may sit and be secured.

As shown in FIGS. 1-4, each side panel 38 is a metal tubular beam and includes a plurality of side receivers 39 positioned on an outer surface thereof. The side receivers 39 include slots to receive side panel sections (not shown) that can be framed around an area above the non-skid deck 42. This would allow the platform 30 to include walls about the non-skid deck 42.

Now with reference to FIGS. 1-8, the drive system 50 will be discussed and generally includes a power system 52 and a control system 60 connected to the power system 52.

Figure 4:
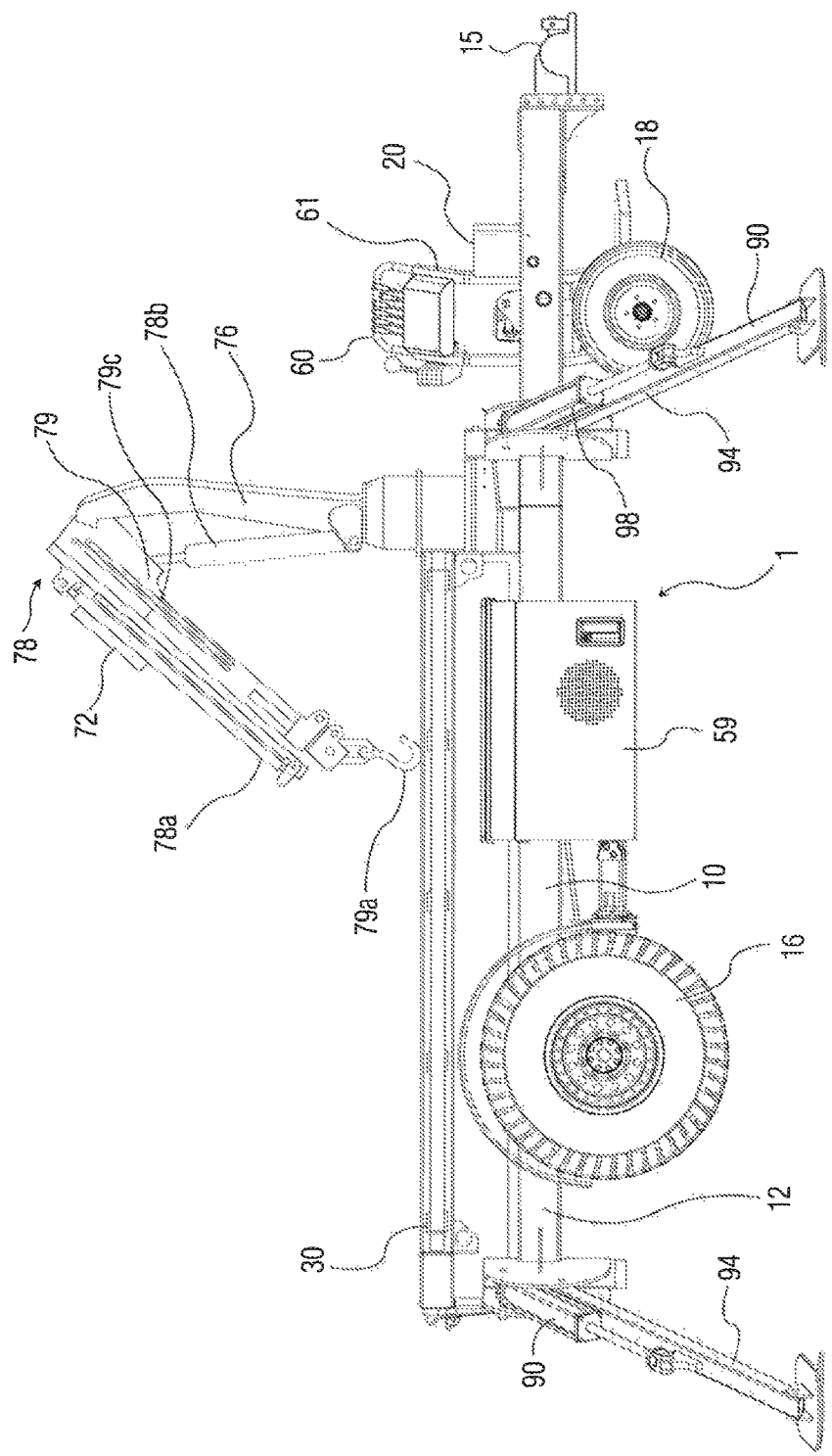
FIG. 4 is a left side view of the trailer of FIG. 1.
Figure 7:
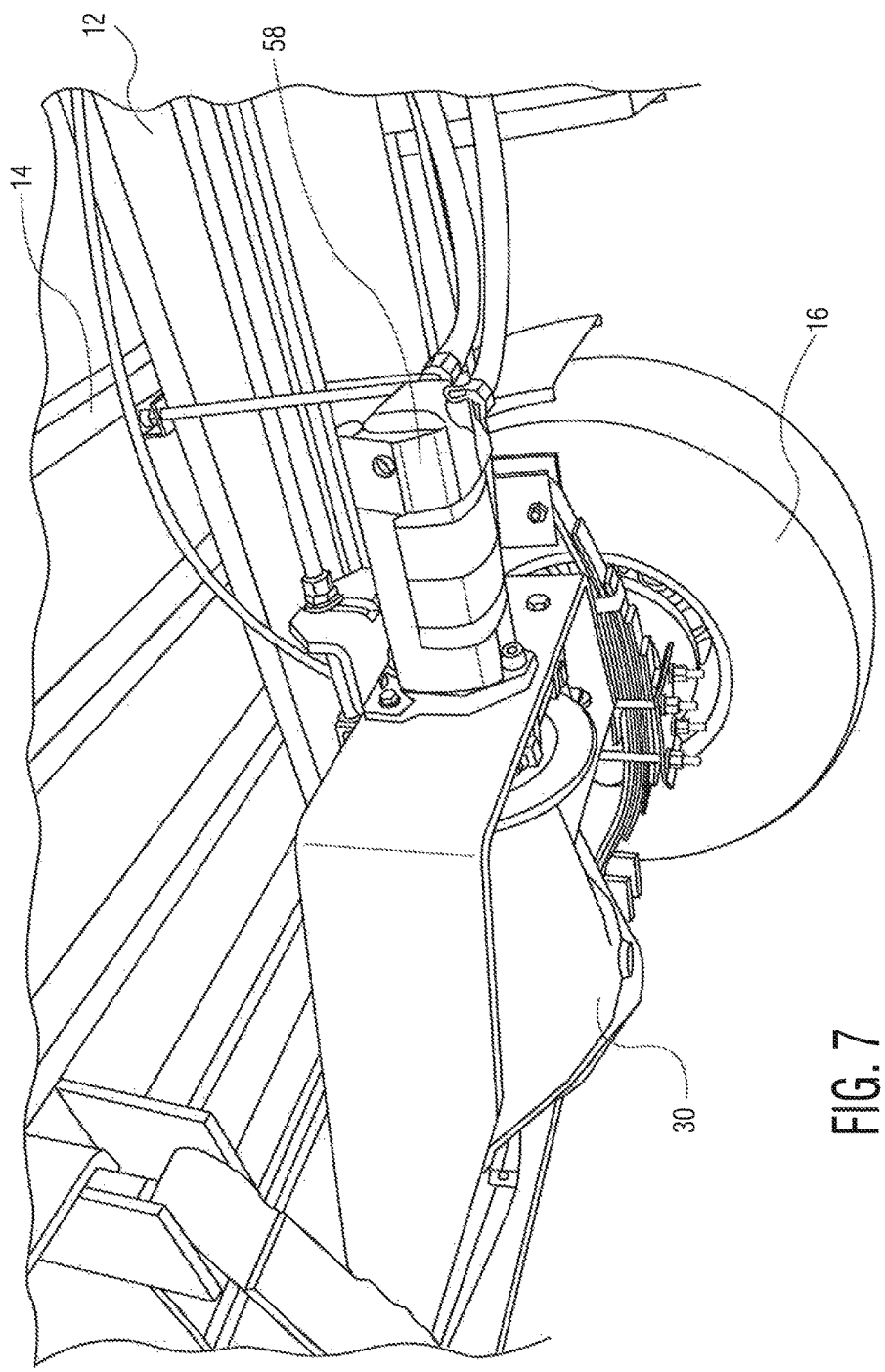
FIG. 7 is a close up bottom view of the trailer according to the invention, showing rear wheels of the drive system.
Figure 8:
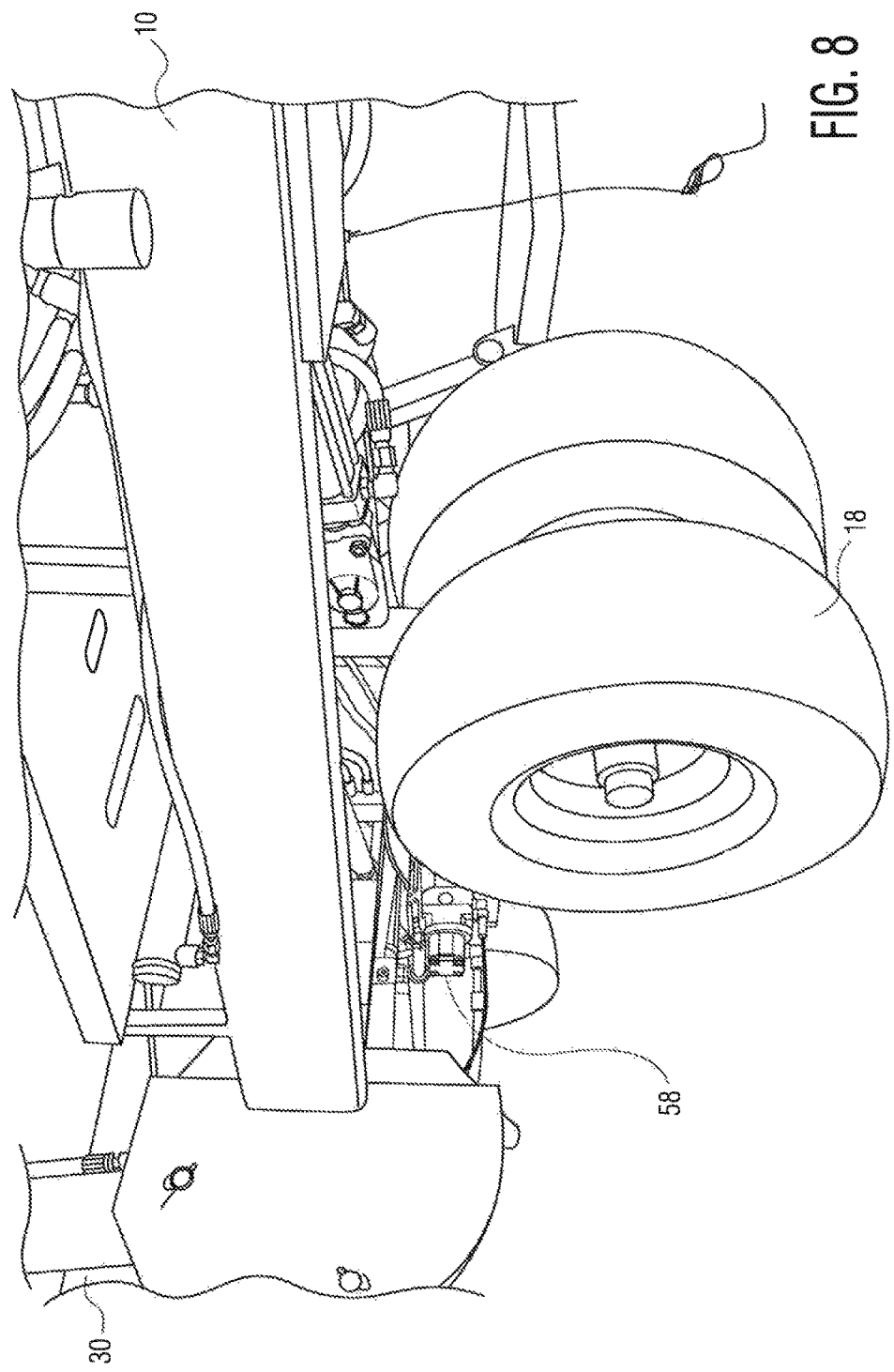
FIG. 8 is a close up bottom view of the trailer according to the invention, showing steerable front wheels of the drive system.
Figure 9:
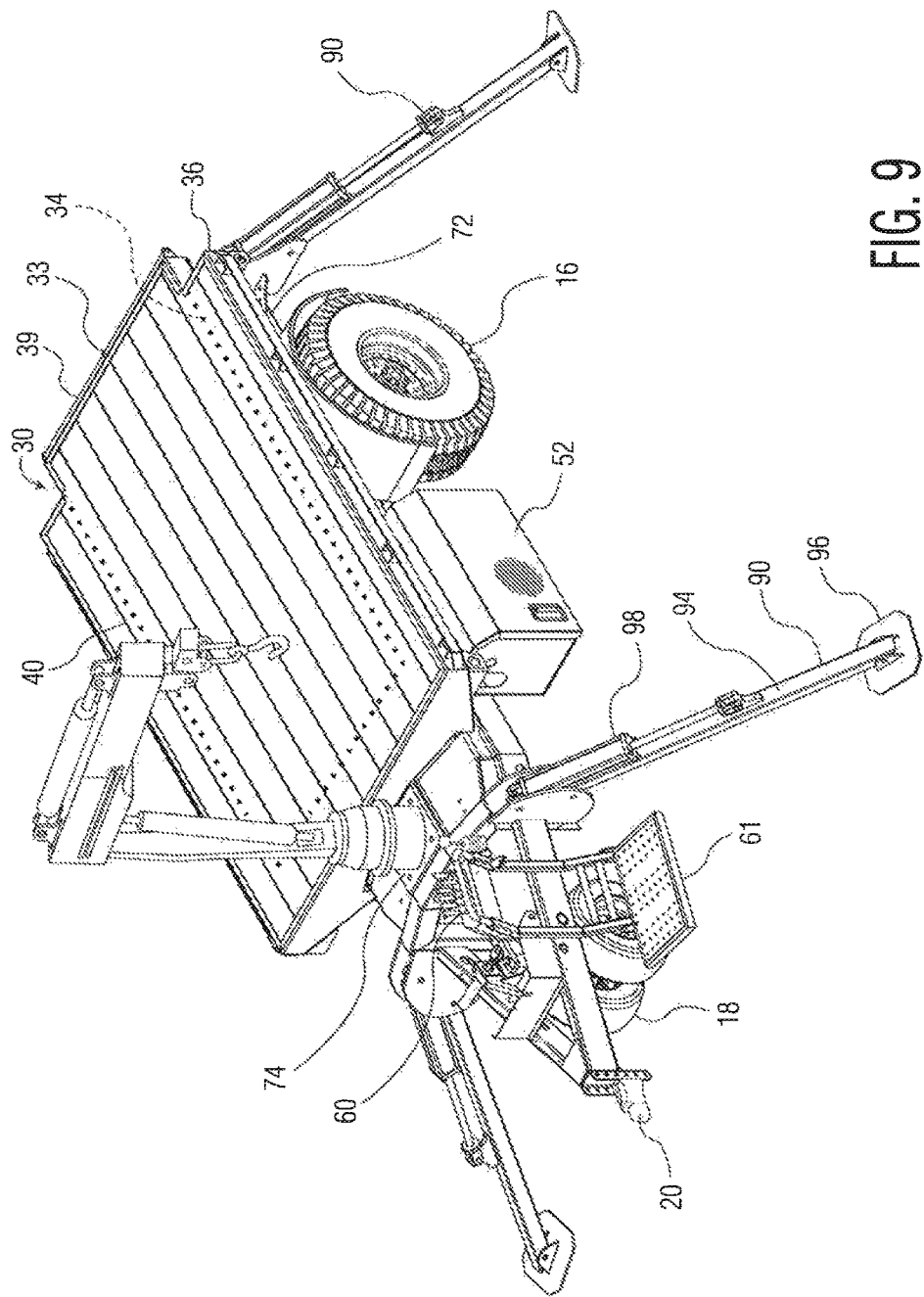
FIG. 9 is another perspective view of a trailer according to the invention.

In the shown embodiment, the power system 52 includes an internal combustion engine 54, a battery 56 connected to the combustion engine 54, a hydraulic motor 58 also connected to the combustion engine 54, a hydraulic pump 59 connected to the hydraulic motor 58 (see FIGS. 4 and 7). The small internal combustion engine 54 powers the drive system 50. Though, in other embodiments, the drive system 50 could be powered by other known means, such as an electric motor powered by a battery or other power sources. In the shown embodiment, the power system 52 is interconnected with rear drive wheels 16 using a hydraulic motor 58 installed adjacent to the rear drive wheels 16 and interconnected to the hydraulic pump 59 using hydraulic lines.

One skilled in art should appreciate that other designs are possible. For instance, the power system 52 may include other methods to move the rear drive wheels 16, including chains, belts, or a drive shaft and a transmission connected to the combustion engine 54, so that trailer 1 can be moved around a work site under its own power.

Regardless of the specific mode of powering the rear drive wheels 16, the power system 52 connects to the control system 60 for starting, and stopping the rear drive wheels 16, as well as for regulating their speed. The control system 60 includes a plurality of controls 62 which may be a series of buttons, levers, or other suitable controls allowing the operator to control retracting and lowering and steering of the steerable front wheels 18 and power to the rear drive wheels 16, as well as adjusting the stabilizer 90.

Controls may also optionally be provided on the control system 60 for controlling certain other features of the trailer 1. As shown in FIG. 1, an operator stand 61 may optionally be provided in the vicinity of the control system 60 allowing an operator to move along with the trailer 1 as he controls its motion. The control system 60 therefore provides an operator with the ability to control all features of the trailer 1 from a single location while optionally standing on an operator stand 61 and moving along with the trailer 1 as it travels under its own power.

In the shown embodiment, the steerable front wheels 18 are a pair of small wheels mounted together on a common axle and steered by direct connection to the hydraulic pump 59 through hydraulic lines. However, one skilled in the art should appreciate that other designs are possible, including a conventional steering wheel. In combination with the powered rear drive wheels 16 and steerable front wheels 18, the trailer 1 can effortlessly move around a work site even when platform 30 bears a full load of building materials.

Now with references to FIGS. 1-5, the lifting device 70 will be described. As shown, the lifting device 70 includes a crane 72 and a controller 80.

The crane 72 is mounted on the frame 10, between the rear drive wheels 16 and the steerable front wheels 18. The crane 72 can be a convention boom crane adapted for handling heavy objects, such as building materials. The crane 72, as shown, generally includes a mounting device 74, a mast 76 secured to the mounting device 74, an adjustable boom 78 supported by the mast 76, and a power winch 79. The mounting device 74 is mounted on frame 10 in fixed position between the steerable front wheels 18 and the rear drive wheels 16, in front of the platform 30. The mast 76 can rotate about the mounting device 74, while the adjustable boom 78 includes a telescopic arm 78a to extend the length of the adjustable boom 78 and a hydraulic arm 78b to adjust an angle of the adjustable boom 78 with respect to the mast 76. The power winch 79 includes a connector 79a (i.e. hook), a cable 79b, and a motor 79c. In the shown embodiment, the motor 79c is connected to the adjustable boom 78 and the cable 79b runs along a length of the adjustable boom 78 to an end, where the connector 79a is positioned.

Figure 5:
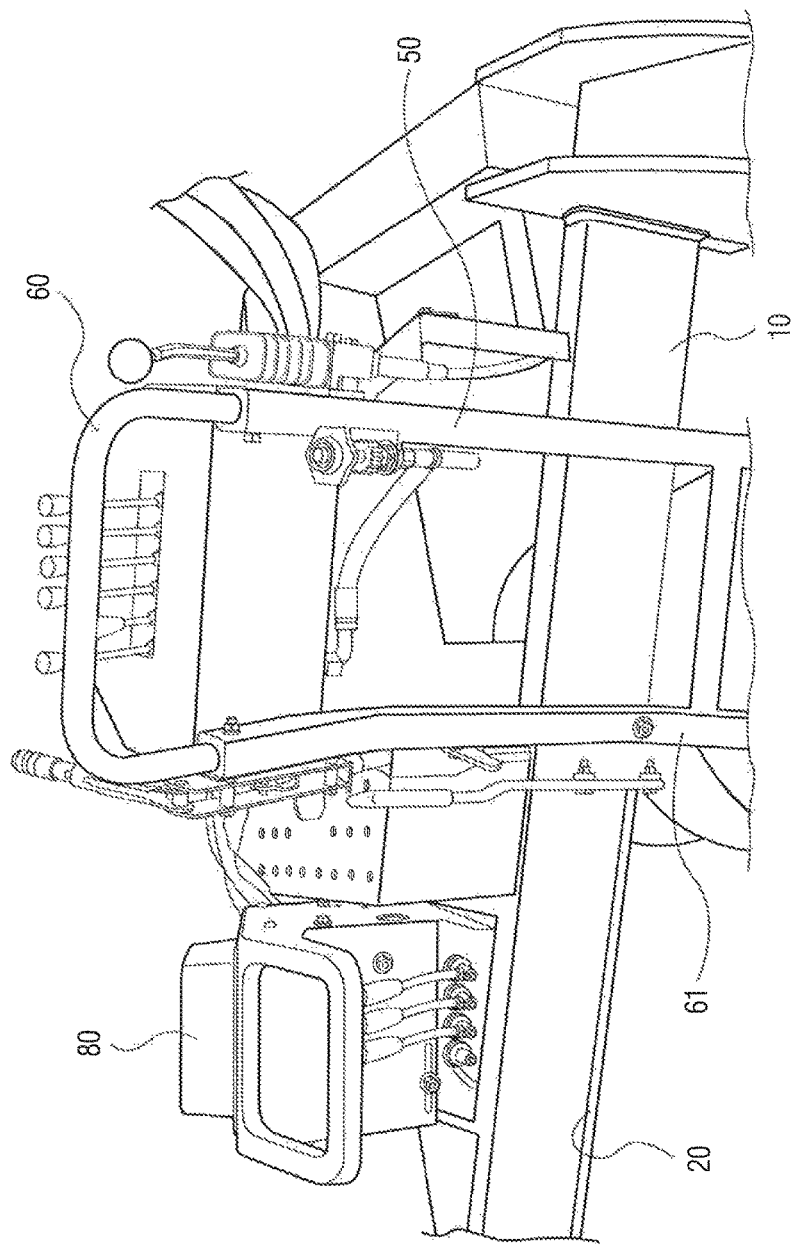
FIG. 5 is a close up left side view of the trailer according to the invention showing a control system for a drive system.
Figure 6:
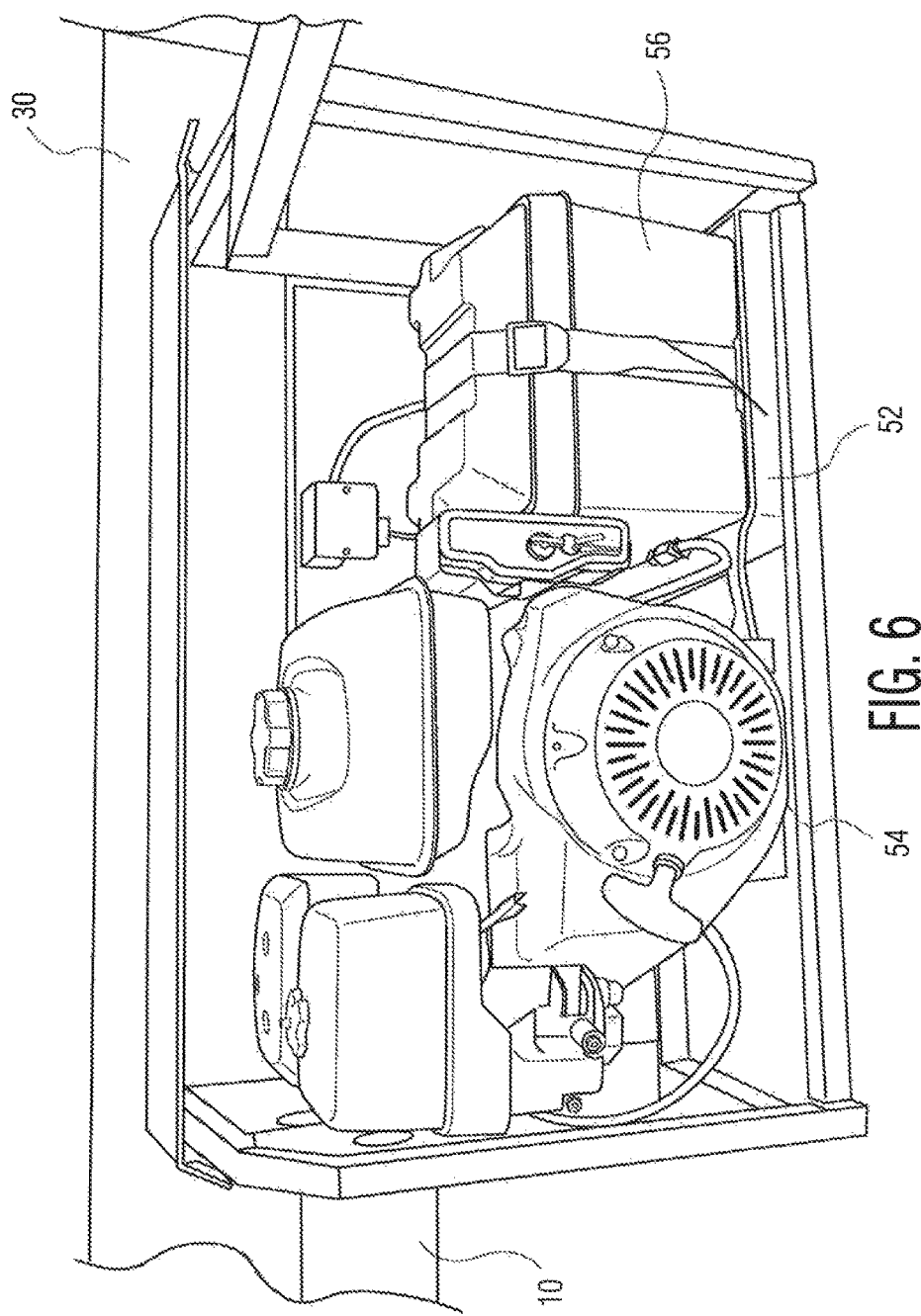
FIG. 6 a close up right side view of the trailer according to the invention showing a power system for the drive system.

As shown in FIG. 5, the crane 72 is controlled by a controller 80 positioned adjacent to the control system 60. However, one skilled in the art should appreciate that the control means of the controller 80 could be incorporated into the structural design of the control system 60. According to the invention, the controller 80 connects to the hydraulic pump 59 through hydraulic lines, in order to control rotation of the mast 76 and movement of the adjustable boom 78. The controller 80 also includes controls to adjust the power winch 79 which is energized by the battery 56.

Now with reference to FIGS. 1-4, the stabilizers 90 will be discussed. As shown, each stabilizer 90 includes an outrigger 92 and hydraulically extendible pistons 98. The stabilizers 90 are positioned near at least the rear corners of the trailer 1 in the shown embodiment. However, one skilled in the art would appreciate that other designs are possible, having one more or less stabilizers than what is shown. As shown, each outrigger 92 include an arm 94 pivotably connected to frame 10 and a foot 96 pivotably connected to an end of the arm 94. One end of the piston 98 connects to the frame 10, while an opposite end connects to the arm 94.

Now with reference to FIG. 1-8, operation of the trailer 1 will be described.

Building materials can be loaded and secured on top of the platform 30 at a location different than the work site. A truck (not shown) connects to the frame 10 using the towing device 20. The operator raises the steerable front wheels 18 and rear drive wheels 16 are set to disengage the drive system 50 using the control system 60. The trailer 1 then can operate as a standard trailer and be towed behind the connected truck to the work site.

At the work site, the operator may access ramps and mats, or other tools and materials, stored in the storage unit 44, to cover any areas of the worksite that may be problematic, including sandy and muddy areas. The operator lowers the steerable front wheels 18 so that they can support the frame 10 and disconnects the frame 10 from the truck. The operator then uses the control system 60 to move the trailer 1 to a desired location on the work site using the drive system 50, as described above. The operator may now use the control system 60 to stabilize the trailer 1 and control the lifting device 70.

Now with reference to FIG. 9-12, operation of lifting device 70 will be described.

Figure 10:
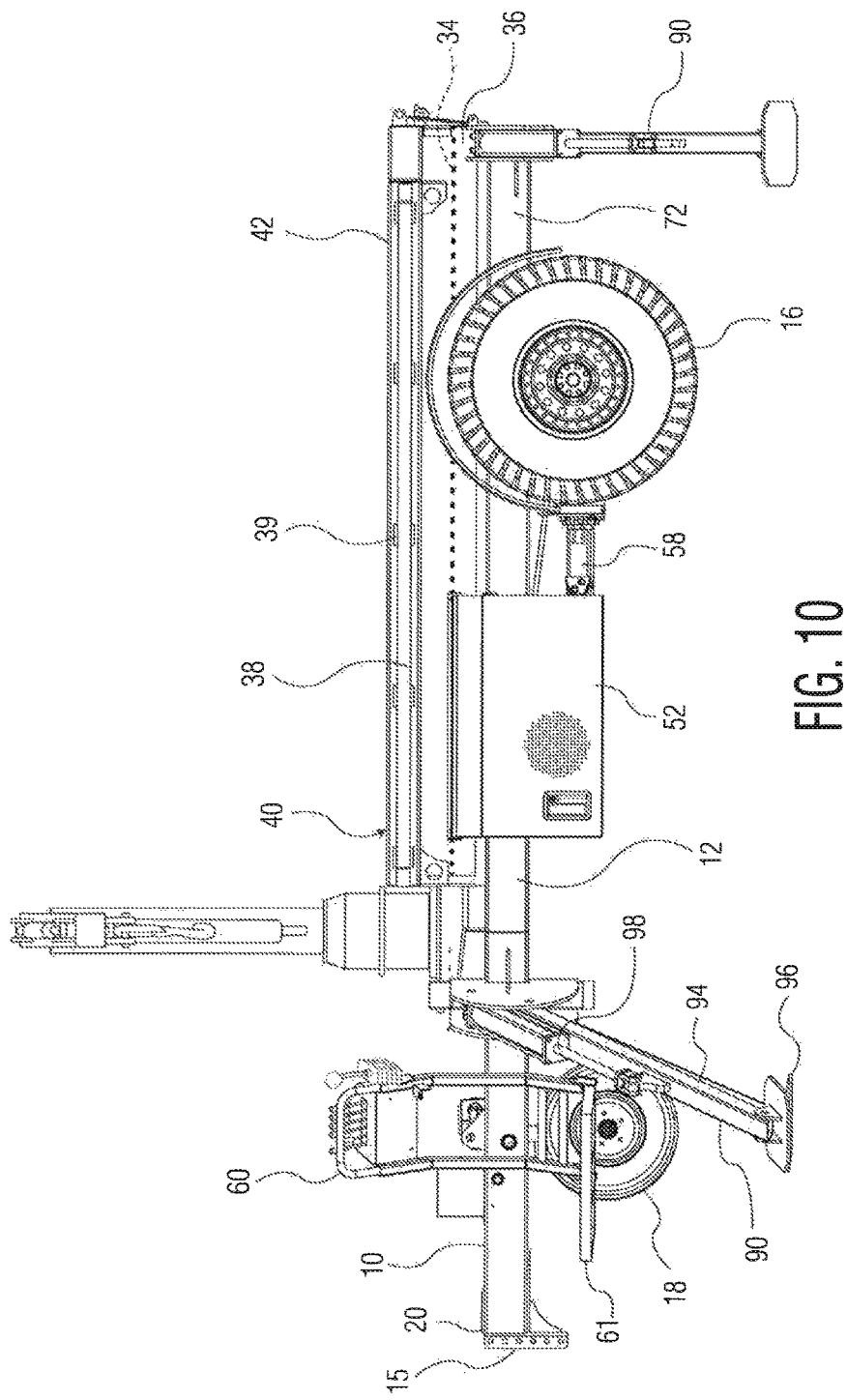
FIG. 10 is a right side view of the trailer of FIG. 9.
Figure 11:
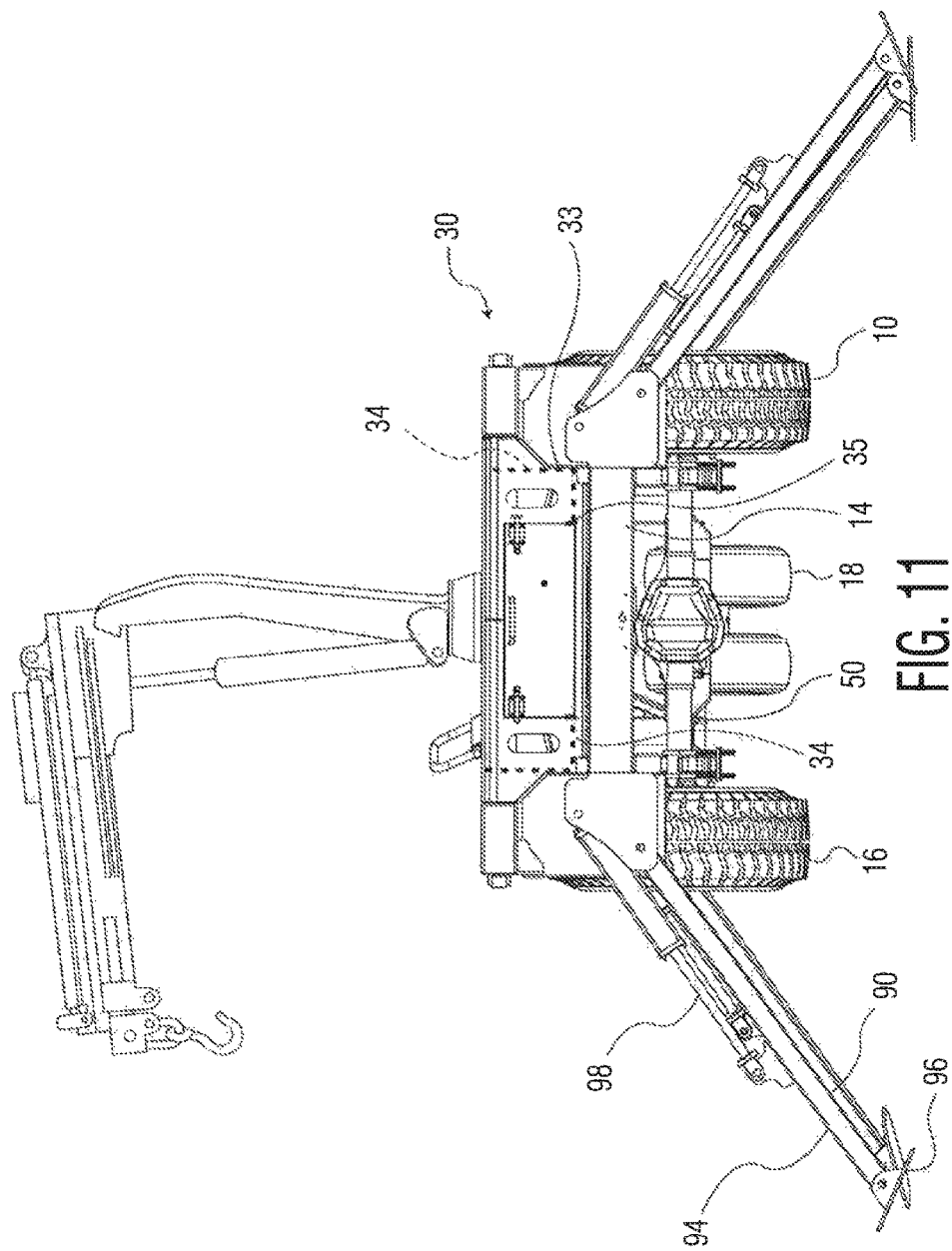
FIG. 11 is a rear view of the trailer of FIG. 9.

Once the operator has determined that the trailer 1 is in position to unload building materials from the platform 30, the operator can manage the stabilizers 90 to stabilize and level the trailer 1. As shown in FIG. 10, the pistons 98 control the arms 94 so that each foot 96 is positioned at or around ground level, below the steerable front wheels 18 and the rear drive wheels 16, in order to stabilize trailer 1 during operation of the lifting device 70. The pistons 98 control the arms 94 so that foot 96 can rest at ground level in order to level the trailer 1 during operation of the lifting device 70.

Once the trailer 1 is stabilized, the operator uses the controller 80 to control the crane 72. The operator can adjust the rotation of the mast 76, length of the telescopic arm 78a, and angle of the adjustable boom 78 with respect to the mast 76. Also, the operator can control the power winch 79 to move building materials from the platform 30 to any area on the worksite.

The foregoing illustrates some of the possibilities for practicing the invention. Many other embodiments and fields of use for the trailer 1 are possible and within the scope and spirit of the invention. It is, therefore, intended that the foregoing description be regarded as illustrative rather than limiting.

What is claimed is:

1. A self-propelled trailer comprising:
   a frame;
   a pair of rear drive wheels positioned under the frame along one end thereof;
   a steerable wheel positioned under the frame along an opposite end thereof with respect to the pair of rear drive wheels;
   a drive system having a power system connected to the pair of rear drive wheels and a control system connected to the steerable wheel;
   a platform positioned above and secured to the frame and having a sub frame and deck with a planar surface positioned above the sub frame, the sub frame includes a plurality of side panels extending upward to the deck and providing a storage unit there between; and
   a lifting device positioned between the steerable wheel and the pair of rear drive wheels with respect to a length of the frame and having a crane extending upward from the frame.

2. The self-propelled trailer of claim 1, wherein the frame includes a plurality of support beams extending along a length thereof.

3. The self-propelled trailer of claim 2, wherein the frame further includes a plurality of connection beams running substantially perpendicular to and connecting with the plurality of support beams to form an undercarriage chassis.

4. The self-propelled trailer of claim 3, wherein the platform is secured to the undercarriage chassis and the deck is a non-skid deck positioned on top of the sub frame.

5. The self-propelled trailer of claim 4, wherein the plurality of side panels extend upward from a top surface mount to form a deck receiving section.

6. The self-propelled trailer of claim 5, wherein the storage unit is an open receiving space within the sub frame and is positioned above the frame and below the deck receiving section.

7. The self-propelled trailer of claim 5, wherein the non-skid deck includes a plurality of planks positioned side-by-side and received by the deck receiving section on top of the top surface mount.

8. The self-propelled trailer of claim 2, wherein the crane includes a mounting device mounted to the frame and a mast rotatable about the mounting device.

9. The self-propelled trailer of claim 8, wherein the crane further includes an adjustable boom having a telescopic arm connected to the mast and a hydraulic arm adjusting an angle of the adjustable boom with respect to the mast.

10. The self-propelled trailer of claim 9, further comprising a controller connecting to and controlling the crane.

11. The self-propelled trailer of claim 10, wherein the controller is positioned adjacent to the control system.

12. The self-propelled trailer of claim 11, wherein the controller is integrated with the control system.

13. The self-propelled trailer of claim 1, wherein the power system includes an internal combustion engine and a hydraulic motor connected to the internal combustion engine.

14. The self-propelled trailer of claim 1, wherein the crane is mounted on the frame between the pair of rear drive wheels and the steerable wheel.

15. A self-propelled trailer comprising:
    a frame with a towing device at one end and a pair of rear drive wheels positioned at another end thereof;
    a drive system having a power system connected to the pair of rear drive wheels;
    a platform having a sub frame positioned on top of the frame and a deck positioned on the sub frame, the sub frame having a storage unit the storage unit within the sub frame and under a deck receiving section, the storage unit extending substantially along the length and width of the platform further having an access panel positioned centrally between the pair of rear drive wheels, a top surface mount positioned above the storage unit, and a plurality of side panels extending upward from the top surface mount to form a deck receiving section; and
    a lifting device having a crane extending upward from the deck and positioned between the towing device and the pair of rear drive wheels with respect to a length of the frame.

16. The self-propelled trailer of claim 15, wherein the frame includes a plurality of support beams extending along a length thereof.

17. The self-propelled trailer of claim 16, wherein the frame further includes a plurality of connection beams running substantially perpendicular to and connecting with the plurality of support beams to form an undercarriage chassis.

18. The self-propelled trailer of claim 17, wherein the platform is positioned on top of and secured to the undercarriage chassis.

19. The self-propelled trailer of claim 18, wherein the crane includes a mounting device mounted to the frame and a mast rotatable about the mounting device.

20. The self-propelled trailer of claim 19, wherein the crane further includes an adjustable boom having a telescopic arm connected to the mast and a hydraulic arm adjusting an angle of the adjustable boom with respect to the mast.

21. The self-propelled trailer of claim 20, further comprising a controller connecting to and controlling the crane.

22. A self-propelled trailer comprising:
    a frame;
    a pair of rear drive wheels positioned under the frame along one end thereof;
    a steerable wheel positioned under the frame along an opposite end thereof with respect to the pair of rear drive wheels;
    a drive system having a power system connected to the pair of rear drive wheels and a control system connected to the steerable wheel;
    a platform positioned above and secured to the frame and having a top planar surface the platform further having a sub frame including a storage unit within the sub frame and positioned below a deck receiving section, the storage unit extending substantially along the length and width of the platform further having an access panel positioned centrally between the pair of rear wheels; and a lifting device positioned between the steerable wheel and the pair of rear drive wheels with respect to a length of the frame and having a crane extending upward from the frame.

\* \* \* \* \*

UNITED STATES PATENT AND TRADEMARK OFFICE
CERTIFICATE OF CORRECTION

PATENT NO. : 10,300,970 B2  
APPLICATION NO. : 14/789470  
DATED : May 28, 2019  
INVENTOR(S) : Aaron Jay Beiler Page 1 of 1

It is certified that error appears in the above-identified patent and that said Letters Patent is hereby corrected as shown below:

On the Title Page

Column 2, Item (56), the following references are not printed:

| | | |
|---|---|---|
| 4184425 | 1980-01-22 | Donald J. Haney, et al. |
| 2857062 | 1958-10-21 | Allan G. Anderson |
| 5960662 | 1999-10-05 | Frederick Morello |
| 2639187 | 1953-05-19 | Edward S. Grumbache |
| 7878524 B1 | 2011-02-01 | Craig Robert Hemmingsen |
| 6779616 B1 | 2004-08-24 | Clifford Brown |
| 4913253 | 1990-04-03 | John M. Bowling |
| 3567051 | 1971-03-02 | Irvine Allan Bell |

Signed and Sealed this  
Seventh Day of January, 2020

Andrei Iancu  
*Director of the United States Patent and Trademark Office*